United States Patent [19]

Baker et al.

[11] Patent Number: 5,784,296
[45] Date of Patent: Jul. 21, 1998

[54] METHOD AND APPARATUS FOR SPECTRAL ANALYSIS IN A DISK RECORDING SYSTEM

[75] Inventors: Bill R. Baker, Redwood City; James Fitzpatrick, Mountain View, both of Calif.

[73] Assignee: Quantum Corporation, Milpitas, Calif.

[21] Appl. No.: 640,416

[22] Filed: Apr. 30, 1996

[51] Int. Cl.$^6$ ............................................. G01B 17/00
[52] U.S. Cl. ..................... 364/551.01; 364/724.01; 360/53
[58] Field of Search ............... 364/551.01, 572, 364/576, 724, 726, 579, 724.01, 724.08, 724.13, 724.14, 431.04; 360/31, 53, 65–66, 73.01, 73.03, 75, 25, 51; 324/607, 615; 369/59

[56] References Cited

U.S. PATENT DOCUMENTS

| | | | |
|---|---|---|---|
| 3,881,184 | 4/1975 | Koepcke et al. | 360/78 |
| 4,066,881 | 1/1978 | Houdard | 364/726 |
| 4,485,414 | 11/1984 | Baker | 360/10.3 |
| 4,628,379 | 12/1986 | Andrews, Jr. et al. | 360/77 |
| 4,777,544 | 10/1988 | Brown et al. | 360/75 |
| 4,884,206 | 11/1989 | Mate | 364/431.08 |
| 4,953,117 | 8/1990 | Lagadec | 364/724.1 |
| 5,130,866 | 7/1992 | Klaassen et al. | 360/75 |
| 5,291,140 | 3/1994 | Wagner | 324/615 |
| 5,293,369 | 3/1994 | Melas et al. | 364/723 |
| 5,295,128 | 3/1994 | Hutchins et al. | 360/51 |
| 5,301,080 | 4/1994 | Ottesen et al. | 360/66 |
| 5,377,131 | 12/1994 | Ottesen et al. | 364/724.01 |
| 5,392,295 | 2/1995 | Coker et al. | 371/21.2 |
| 5,404,492 | 4/1995 | Moraru et al. | 395/500 |
| 5,412,519 | 5/1995 | Buettner et al. | 360/73.03 |
| 5,424,638 | 6/1995 | Huber | 360/25 |
| 5,563,746 | 10/1996 | Bliss | 360/53 |
| 5,592,346 | 1/1997 | Sullivan | 360/77.04 |

*Primary Examiner*—Emanuel T. Voletz
*Assistant Examiner*—Bryan Bui
*Attorney, Agent, or Firm*—David B. Harrison; Debra A. Chun

[57] ABSTRACT

A method of performing spectral analysis of signals recorded by a magnetic recording or storage system is provided using a modified channel chip of the system. The modified channel chip enables measurement of harmonic components of the recorded signal. The recorded signal is a periodic analog signal having a period N. The method is performed by reading the recorded periodic analog signal and converting the signal into a discrete time periodic signal. The discrete time periodic signal is digitally sampled at predetermined intervals, and the digital samples are selectively accumulated in a register or registers of the channel chip. Incoming digital samples are accumulated by selectively being added to contents of the registers, or alternately being added and substracted to contents of a single register. The accumulated results represent summations used to determine harmonic coefficients of the recorded signal. The harmonic coefficients can then be used to compute a phase and amplitude for a particular harmonic k of the recorded signal. The modified channel chip used to perform the method of spectral analysis includes a simple harmonic sensor for performing the accumulations. The harmonic sensor includes an arithmetic unit and a register or registers for accumulating the digital samples. The arithmetic unit alternately adds and substracts digital samples to contents of the register, or selectively adds digital samples to contents of a particular register.

11 Claims, 3 Drawing Sheets

METHOD AND APPARATUS FOR SPECTRAL ANALYSIS IN A DISK RECORDING SYSTEM

BACKGROUND OF THE INVENTION

Disk recording systems include a number of parameters which can affect system reliability and performance. By measuring spectral content of signal components of the disk recording system, many of these parameters can be optimized to improve reliability and performance of the system. In particular, measurements of specific harmonics of the signal components at a particular frequency can be used to determine, for example, overwrite, nonlinear transition shift, changes in head fly height, optimal MR bias current, and optimal microjog. More particularly, calculation of amplitude and phase of a specific harmonic of the signal can be used to monitor system quality or integrity for improved system performance and reliability.

A periodic analog signal written on a data storage disk of the recording system can be converted into a discrete time periodic signal which can be represented as a finite sum of weighted sine and cosine functions. In particular, if the signal has a period of N, the signal at instant n·T can be written as:

$$x_n = \sum_{k=0}^{N-1} \left[ a_k \cdot \cos\left(\frac{2\pi k n}{N}\right) + b_k \cdot \sin\left(\frac{2\pi k n}{N}\right) \right], \quad \text{(Eq. 1)}$$

and the magnitude of the discrete Fourier transform of the $k^{th}$ harmonic of the periodic signal can be measured as the square root of the sum of the square of the coefficients, $a_k$ and $b_k$, of that harmonic. The values of the coefficients can be computed as:

$$a_k = \frac{2}{N} \sum_{n=0}^{N-1} x_n \cos\left(\frac{2\pi k n}{N}\right) \text{ and } b_k = \frac{2}{N} \sum_{n=0}^{N-1} x_n \sin\left(\frac{2\pi k n}{N}\right). \quad \text{(Eqs. 2)}$$

The amplitude $\rho_k$ and phase $\upsilon_k$ of the $k^{th}$ harmonic are defined as $$\rho_k = \sqrt{a_k^2 + b_k^2} \text{ and } \upsilon_k = \arctan\frac{(b_k)}{a_k}. \quad \text{(Eqs. 3)}$$

Eqs. 2 and 3 can be used to compute the amplitude and phase of the periodic signal written on the disk. Typically, very many repetitions of a periodic sequence or pattern are recorded or written on the disk. By repeatedly computing Eqs. 2 for the repetitions of the pattern, the average amplitude $\rho_k$ and phase $\upsilon_k$ of the $k^{th}$ harmonic of the signal can be determined. For example, if M repetitions of a periodic sequence having a length N are recorded, then $$Avg(a_k) = \frac{2}{M \cdot N} \sum_{n=0}^{M \cdot N-1} x_n \cos\left(\frac{2\pi k n}{N}\right) \text{ and } Avg(b_k) = \quad \text{(Eqs. 4)}$$

$$\frac{2}{M \cdot N} \sum_{n=0}^{M \cdot N-1} x_n \sin\left(\frac{2\pi k n}{N}\right).$$

Since sine and cosine functions are periodic with period $2\pi$, for any integer m, $$\sin\left(2\pi \frac{k}{N} \cdot n\right) = \quad \text{(Eqs. 5)}$$

$$\sin\left(2\pi \frac{k}{N} \cdot \left(n + \frac{N}{k}\right)\right) = \sin\left(2\pi \frac{k}{N} \cdot \left(n + \frac{mN}{k}\right)\right)$$

and $$\cos\left(2\pi \frac{k}{N} \cdot n\right) =$$

$$\cos\left(2\pi \frac{k}{N} \cdot \left(n + \frac{N}{k}\right)\right) = \cos\left(2\pi \frac{k}{N} \cdot \left(n + \frac{mN}{k}\right)\right).$$

Therefore, no more than N values of each trigonometric function are required, and each trigonometric function is multiplied by a sum of M samples, $x_n$, spaced at time intervals of N.

Presently, the spectral content of signal components in magnetic recording systems cannot be measured accurately in a simple and inexpensive manner. Traditionally, a mean square error (MSE) value of a channel, or read-write, chip of the disk recording system is computed to optimize the various operating parameters of the system in an indirect manner. However, not all measurements necessary to determine optimized parameters can be obtained by the use of MSE values. Alternatively, the necessary measurements can be directly obtained by use of a general purpose spectrum analyzer, or similar instrument. These known methods of spectral analysis require additional and/or complex hardware that is very costly. Thus, there exists a need for a simple, efficient and accurate way of performing spectral analysis in a disk recording system.

SUMMARY OF THE INVENTION

The method and improved channel chip for performing spectral analysis of the present invention satisfy this need.

In accordance with aspects of the present invention, a method of performing spectral analysis in a disk recording system is carried out using a modified detector or channel chip. An analog signal having a periodic waveform is read and converted to a discrete time periodic signal. The discrete signal is sampled at predetermined intervals to obtain discrete samples. The discrete samples are accumulated in the channel chip to provide a predetermined number of accumulated results, which are then scaled to provide coefficients of a selected harmonic component of the periodic signal. The coefficients are then used to determine an amplitude and phase for the selected harmonic component. Once the amplitude and/or phase are determined, they can be used to optimize various parameters of the disk recording system.

In one embodiment of the method, the kth harmonic can be obtained after one read pass of the analog signal having a period N. As each discrete sample is obtained, the sample is added to contents of 1 of N/k registers, where the register is chosen based on a modulo-N/k counter. After a particular sample is added to the register, the modulo-N/k counter is incremented and subsequent discrete samples are added to the contents of a register, as indicated by the modulo-N/k counter. When all the discrete samples of the discrete time periodic signal have been accumulated, the contents of the N/k-registers are transferred to a microprocessor of the disk recording system. For this embodiment, N/k is an integer. If N/k is not an integer, a similar embodiment using N registers and a modulo-N counter could be implemented.

In an alternative embodiment of the method, the accumulated results are obtained over several read passes of the signal, using a single register. A discrete sample is received as a starting sample, and based on the starting sample, predetermined discrete samples are selectively accumulated in the register, where the predetermined samples are selected based on a sequential relationship with the starting sample. When an end of the discrete time periodic signal is reached, contents of the register is transferred to the microprocessor. On the next rotation or pass over the data, a different discrete sample is received as the starting sample, and the steps of selectively accumulating predetermined discrete samples based on this starting sample, and transferring the contents of the register to the microprocessor when the end of the discrete time periodic signal is reached is repeated until all of the discrete samples making up the discrete time periodic signal have been accumulated and transferred to the microprocessor. Preferably, the step of accumulating the predetermined discrete samples in the register is carried out by alternatively adding and subtracting a discrete sample to and from the contents of the register.

The method of the present invention can be implemented with a new improved channel or detector chip modified to include a harmonic sensor or accumulator for performing the spectral analysis described above. The new channel chip having features of the present invention includes a sampling digital detector which converts the signal into a sequence of digital bits and a harmonic sensor which selectively accumulates the digital samples. The sampling digital detector typically includes a variable gain amplifier connected to an output of a preamplifier of the recording system, a linear analog filter connected to an output of the variable gain amplifier, an analog-to-digital (A/D) converter connected to the linear analog filter, a linear digital filter connected to the A/D converter and finally a digital detector connected to the linear digital filter.

In one embodiment of the present invention, a harmonic sensor for measuring a kth harmonic of a periodic waveform having a period N, includes a modulo-(N/k) counter, and (N/k) registers for accumulating selected bits of the sequence of digital bits therein. The harmonic sensor additionally includes a 1:(N/k) demultiplexor or demux, a (N/k):1 multiplexor or mux, and arithmetic circuitry for selectively summing a sample of the sequence of bits with contents of a register determined by the modulo-(N/k) counter.

In another embodiment of the invention, the harmonic sensor includes a single register, selection circuitry for selecting every (N/2k)th sample from the sequence of digital samples, and arithmetic circuitry for alternately adding and substracting the sample selected by the selection circuitry to and from contents of the register.

The present invention can be used in various applications to optimize or improve operational parameters of the disk storage system. For example, nonlinear transition shift can be derived using the accumulated results from the harmonic sensor. Other examples of practical applications are calculation of an overwrite parameter of a head/media combination, estimation of the fly height of the disk drive, and determination of the microjog of a magnetoresistive (MR) head of the disk drive. The present invention provides improved accuracy in measuring spectral content of signal components over the prior art methods. Additionally, the present invention facilitates the improvement with simple and inexpensive hardware modifications.

BRIEF DESCRIPTION OF THE DRAWINGS

Other features and advantages of the invention will be understood and appreciated by those of ordinary skill in the art upon consideration of the following detailed description, appended claims and accompanying drawings of preferred embodiments, where:

DETAILED DESCRIPTION

Figure 1:
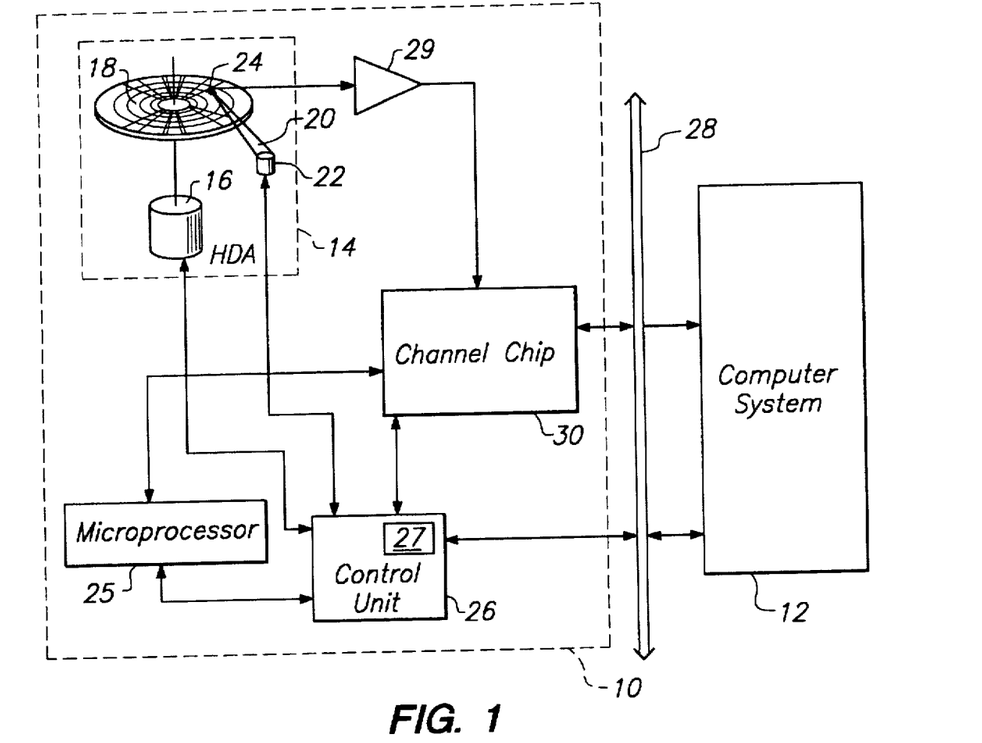
FIG. 1 is a simplified diagram showing a magnetic recording system employing the present invention.

Referring to FIG. 1, a method and channel chip having features of the present invention can be employed in a conventional magnetic disk recording or storage system 10 connected to a computer system 12. The magnetic recording system 10 typically includes an HDA 14 which typically includes a spindle motor 16 for rotating at least one magnetic storage disk 18, and an actuator assembly 20 having an actuator motor 22 for positioning a transducer assembly 24 to read and write data from and to, respectively, the data storage disk 18. The magnetic recording system 10 also includes a microprocessor 25 typically concerned with servo control of the recording system 10, a control unit or controller 26, including a control processor 27, primarily controlling data flow communications with the computer system 12 via a system bus 28 and also controlling components of the recording system 10, a preamplifier 29 amplifying signals read by the transducer assembly 24, and the channel chip 30 processing data being transferred between the HDA 14 of the magnetic storage system 10 and the computer system 12.

Figure 2:
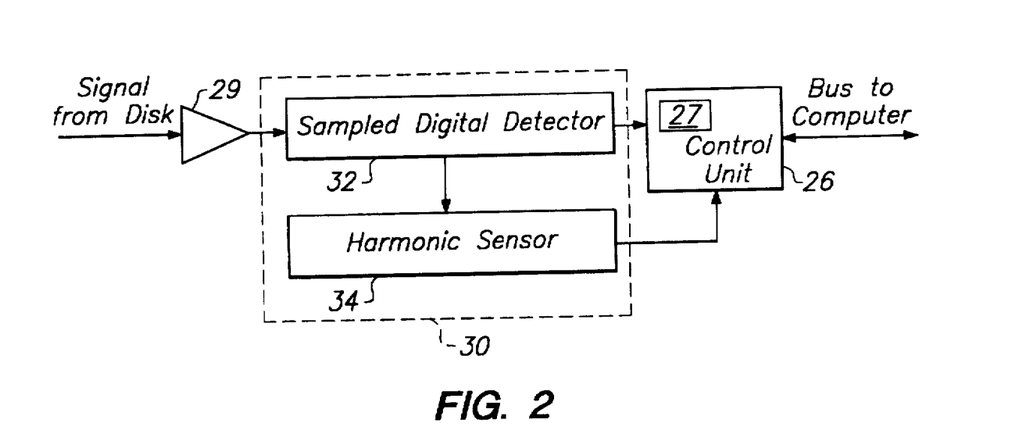
FIG. 2 is a simplified block diagram showing a channel chip having features of the present invention.

A simplified version of the channel chip 30 is shown in FIG. 2. As shown, the channel chip 30 receives an amplified signal from the preamplifier 29. The channel chip 30 includes a sampling digital detector 32 coupled to the preamplifier 29 for digitally sampling the signal read from the disk 18. The sampling digital detector 32 employed in the channel chip 30 of the present invention can be constructed to operate as any form of digital detector such as, for example, a Viterbi detector, a DFE (decision feedback equalizer), a PR4 (partial response mode 4), EPR4 (extended partial response mode 4), or other known digital detectors. A harmonic sensor 34 is coupled to receive digital samples from the sampling digital detector 32. The harmonic sensor 34 processes the digital samples to provide measurements used to calculate the spectral content of the read signal. Details of the harmonic sensor 34 will be described below with respect to FIGS. 4 and 5. The channel chip 30 provides the harmonic sensor 34 measurements to the microprocessor 25 via the control unit 26. The microprocessor 25 can be a conventional intergrated circuit processor chip which has the capability of performing floating point arithmetic, or simply the ability to do integer mathematics.

Figure 3:
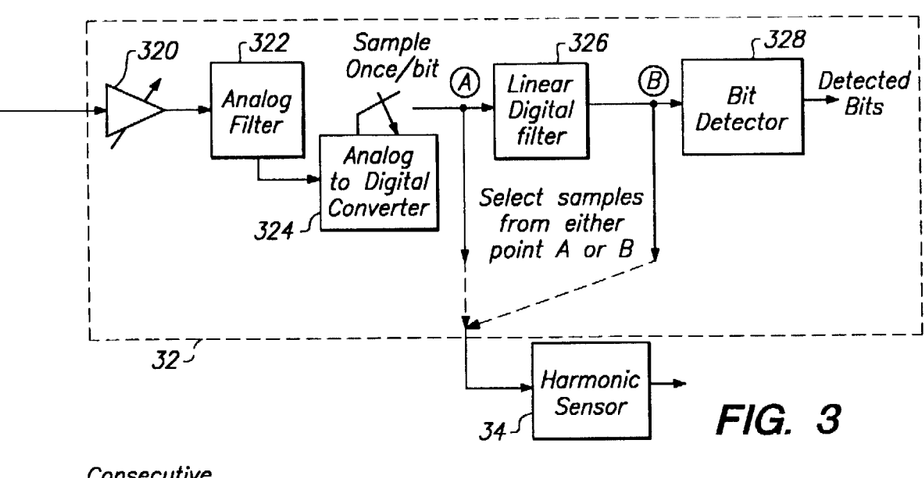
FIG. 3 is a block diagram showing a typical digital detector and simplified harmonic sensor of the channel chip of FIG. 2.

An embodiment of the sampling digital detector 32 of FIG. 2 is shown in greater detail in FIG. 3. In this embodiment, the sampling digital detector 32 comprises a conventional variable gain amplifier 320 coupled to receive the amplified signal from the transducer assembly 24. The variable gain amplifier 320 is set to a fixed value, and is not changed during operation of the method of the present invention. A conventional analog filter 322 is coupled to receive a signal output from the variable gain amplifier 320, and to filter the received signal. The filtered analog signal is converted to a discrete waveform of multibit digital samples by an analog-to-digital (A/D) converter 324 which is connected to the analog filter 322. The A/D converter 324 is also connected to have its converted digital output filtered by a linear digital filter 326. Typically, the linear digital filter 326 is a conventional finite impulse response digital filter. Additionally, the sampling digital detector 32 includes a bit detector 328 which processes the filtered digital waveform to a bit sequence. As discussed above, virtually any type of sampled or sampling digital detector can be used, such as a Viterbi detector, DFE, PR4 or the like.

Figure 4:
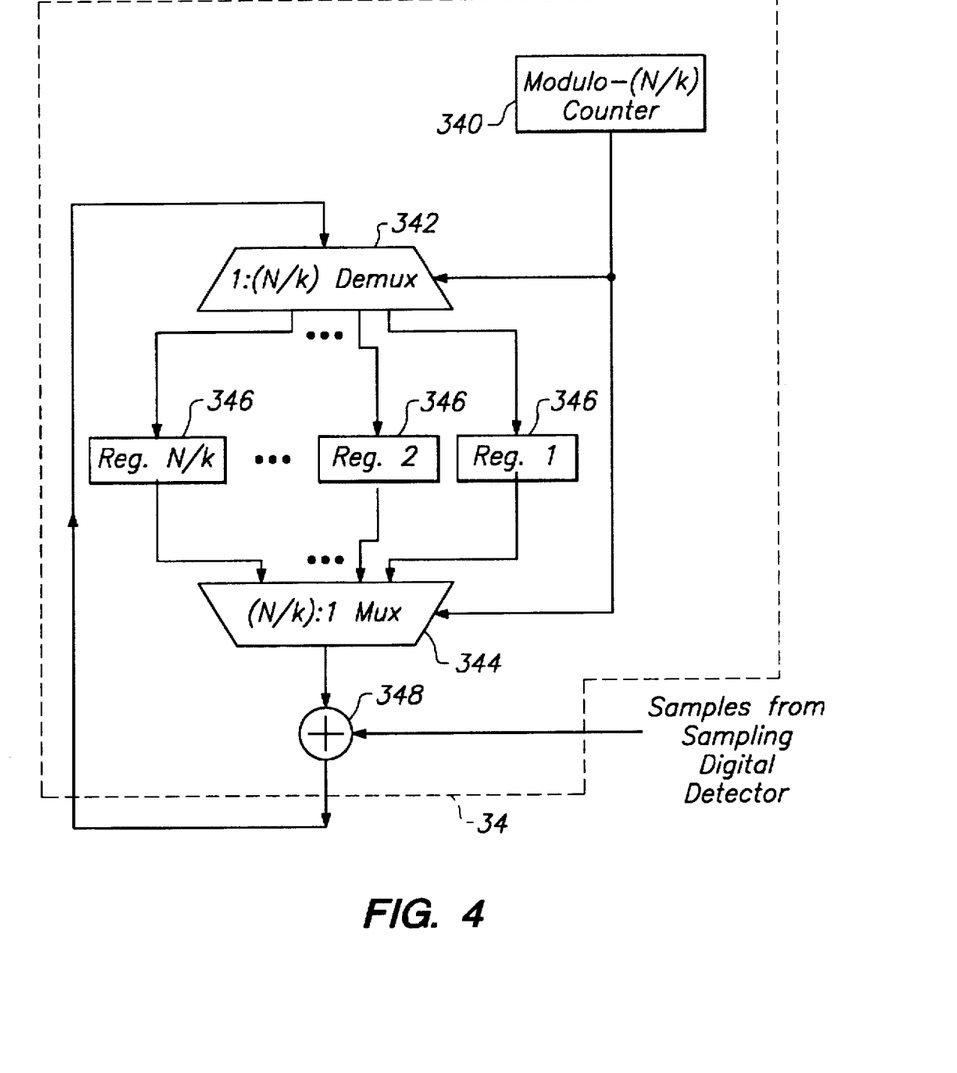
FIG. 4 is a block diagram showing a version of a harmonic sensor of the present invention.

Referring to FIG. 4, a preferred embodiment of the harmonic sensor or accumulator 34 will now be described. The embodiment of the harmonic sensor 34 shown in FIG. 4 includes a modulo counter 340, a demultiplexor or demux 342, a multiplexor or mux 344, and a plurality of registers 346. Preferably, the modulo counter 340 is a modulo-(N/k) counter. Preferably also, the demux 342 is a 1:(N/k) demux having a single multibit input and (N/k) multibit outputs, and the mux 344 is a (N/k):1 mux having (N/k) multibit inputs and a single multibit output. Both the demux 342 and the mux 344 include a control signal input which receives the count from the modulo counter 340. Preferably, the harmonic sensor 34 includes (N/k) registers 346. The (N/k) outputs from the demux 342 are respectively connected to inputs of the (N/k) registers 346, and outputs of the (N/k) registers 346 are connected to the (N/k) inputs of the mux 344. Additionally, the harmonic sensor 34 includes an adder circuit 348 preferably having two multibit inputs and a single multibit output. One input of the adder circuit 348 is connected to receive the output from the mux 344, while the other input is connected to receive a discrete sample from the sampling digital detector 32. The output of the adder circuit 348 is connected to the input of the demux 342.

While the embodiment of the harmonic accumulator 34 described above and shown in FIG. 4 includes (N/k) registers 346 and a modulo-N/k) counter 340, one skilled in the art would readily recognize that the harmonic accumulator 34 could be simplified for signals having a period N being an even integer. For these cases, the accumulator 34 would include (N/2k) registers 346 and a modulo-(N/2k) counter 340.

Figure 5:
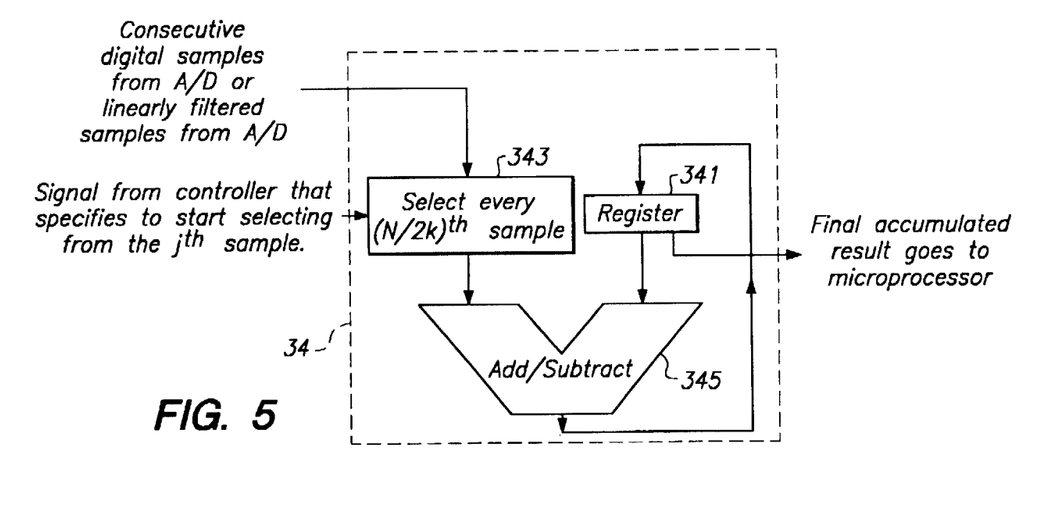
FIG. 5 is a block diagram showing another version of the harmonic sensor of the present invention.

An alternative version of the harmonic sensor 34 is shown in FIG. 5. In this version, the harmonic sensor 34 includes a single register 341, a selection circuit 343, and an arithmetic unit 345. Preferably, the selection circuitry 343 includes an input connected to receive digital samples from the sampling digital detector 32, and an output connected to an input of the arithmetic unit 345. The selection circuitry 343 of the harmonic sensor 34 preferably is configured by the control unit 26 to select a particular digital sample from the sampling digital detector 32 as a starting point from which the selection circuitry 343 starts selecting samples from the sampling digital detector 32.

The arithmetic unit 345 has a first input coupled to receive the output from the selection circuitry 343, as described above, and a second input coupled to receive contents of the register 341. Preferably, the arithmetic unit 345 is configured as an adder subtracter which alternatively adds and substracts the output from the selection circuitry 343 to and from, respectively, the contents of the register 341. The arithmetic unit 345 has an output coupled to store its computed sum/difference into the register 341.

Operation of the channel chip 30 performing the method of the present invention will now be described. From the discussion in the Background section above, it is seen that using Eqs. 5, the computations in Eqs. 4 can be simplified by summing every $(N/k)^{th}$ sample of the signal $x_n$, then scaling the sum by an appropriate phase of the sine or cosine function. Eqs. 4 can thus be rewritten as, (Eqs. 6)

$$\left(\frac{M \cdot N}{2}\right) Avg(a_k) =$$

$$\cos\left(0 \cdot \frac{2\pi k}{N}\right) \cdot \sum_{n=0,(N/k),(2N/k),\ldots}^{M \cdot N-1} x_n +$$

$$\cos\left(1 \cdot \frac{2\pi k}{N}\right) \cdot \sum_{n=1,(1+N/k),\ldots}^{M \cdot N-1} x_n +$$

$$\ldots + \cos\left(\left(\frac{N}{k}-1\right) \cdot \frac{2\pi k}{N}\right) \cdot \sum_{n=((N/k)-1),((2N/k)-1),\ldots}^{M \cdot N-1} x_n$$

and $$\left(\frac{M \cdot N}{2}\right) Avg(b_k) =$$

$$\sin\left(0 \cdot \frac{2\pi k}{N}\right) \cdot \sum_{n=0,(N/k),(2N/k),\ldots}^{M \cdot N-1} x_n +$$

$$\sin\left(1 \cdot \frac{2\pi k}{N}\right) \cdot \sum_{n=1,(1+N/k),\ldots}^{M \cdot N-1} x_n +$$

$$\ldots + \sin\left(\left(\frac{N}{k}-1\right) \cdot \frac{2\pi k}{N}\right) \cdot \sum_{n=((N/k)-1),((2N/k)-1),\ldots}^{M \cdot N-1} x_n.$$

Eqs. 6 show that the average coefficients for the $k^{th}$ harmonic of a periodic signal can be computed by accumulating (N/k) summations and scaling each of the summations by a sine or cosine term. The harmonic sensor 34 is implemented in the channel chip 30 of the present invention to perform the (N/k) summations necessary for the computations of Eqs. 6, and the subsequent scaling by sine and cosine terms are performed by the microprocessor 38. Preferably, (N/k) is chosen to be a small integer so that the number of summations is kept to a small number.

Furthermore, if (N/k) is chosen to be an even integer, the number of summations can be further reduced by recognizing the fact that $\cos(x+\pi)=-\cos(x)$ and $\sin(x+\pi)=-\sin(x)$. Taking advantage of these equivalencies, the summations can be reduced such that every $(N/2k)^{th}$ sample of the periodic signal is summed, and a total of (N/2k) summations are accumulated. Thus, if (N/k) is chosen to be an even integer, Eqs. 6 can be rewritten as (Eqs. 7)

$$\left(\frac{M \cdot N}{2}\right) Avg(a_k) = \cos\left(0 \cdot \frac{2\pi k}{N}\right) \cdot$$

$$\sum_{n=0,(N/k),(2N/k),\ldots}^{M \cdot N-1} (x_n - x_{n-N/2k}) + \cos\left(1 \cdot \frac{2\pi k}{N}\right) \cdot$$

$$\sum_{n=1,(1+N/k),\ldots}^{M \cdot N-1} (x_n - x_{n-N/2k}) + \ldots + \cos\left(\left(\frac{N}{k}-1\right) \cdot \frac{2\pi k}{N}\right) \cdot$$

$$\sum_{n=((N/k)-1),((2N/k)-1),\ldots}^{M \cdot N-1} (x_n - x_{n-N/2k})$$

and $$\left(\frac{M \cdot N}{2}\right) Avg(b_k) = \sin\left(0 \cdot \frac{2\pi k}{N}\right) \cdot$$

$$\sum_{n=0,(N/k),(2N/k),\ldots}^{M \cdot N-1} (x_n - x_{n-N/2k}) + \sin\left(1 \cdot \frac{2\pi k}{N}\right) \cdot$$

-continued $$\sum_{n=1,(1+N/k),\ldots}^{M\cdot N-1} (x_n - x_{n-N/2k}) + \ldots + \sin\left(\left(\frac{N}{k}-1\right)\cdot\frac{2\pi k}{N}\right)\cdot$$

$$\sum_{n=((N/k)-1),((2N/k)-1),\ldots}^{M\cdot N-1} (x_n - x_{n-N/2k}).$$

In operation, the channel chip 30 having features of the present invention receives an analog periodic signal from the transducer assembly 24. The analog signal is amplified by a preamplifier 29 then passed to a sampling digital detector 32 of the channel chip 30. The amplified signal is passed to a variable gain amplifier 320 of the sampling digital detector 32. Tthe variable gain amplifier 320 is set to a fixed value rather than being variable. The analog signal is then filtered by an analog filter 322 before being converted to a digital signal by an analog-to-digital (A/D) converter 324. The converted digital signal is output as time discrete multibit samples to be filtered by a linear digital filter 326, then converted to a bit sequence by a digital detector 328. In one version of the method, the digital samples are transferred to the harmonic sensor 34 for summation from the A/D converter 324 via a path marked by point A shown in FIG. 3. In an alternative version, the digital samples are transferred for summation by the harmonic sensor 34 from the linear digital filter 326 via a path marked by point B since most measurements involve the ratio of two signals.

In one embodiment of the method, (N/k) summations are performed by the harmonic sensor or accumulator 34 shown in FIG. 4 in the following manner. The harmonic accumulator 34 is initialized by setting the contents of the registers 346 to zero. The digital samples taken from either point A or point B of FIG. 3 are passed to the adder circuit 348 and each consecutive sample is added to contents of one of the (N/k) registers 346, then the sum is stored back into one of the registers 346. The contents of a particular register 346 which is to be added to the received sample is selected by a (N/k):1 mux 344 based on an ouput count from the modulo-(N/k) counter 340 which is initially set to one. Similarly, the particular register 346 into which the sum of the adder circuit 348 is to be stored is selected by the output of the modulo-(N/k) counter 340. For a first sample, the adder circuit 348 receives the first sample and the contents of register one, and performs the addition. The sum is output to the 1:(N/k) demux 342 which then transfers the sum to register one. As a next sample is received, the modulo-(N/k) counter 340 is incremented to two and the next sample is added to the second register and stored back in the second register in the manner described for the first sample. This process continues until the (N/k)$^{th}$ sample has been added to the (N/k)$^{th}$ register 346. When an ((N/k)+1)$^{th}$ sample is received, the modulo-(N/k) counter 340 is reset to the value one, and the ((N/k)+1)$^{th}$ sample is added to the contents of the first register 346. The above described steps are repeated until all samples of the digital signal or waveform have accumulated in the registers 346. The (N/k) summations are then transferred to the microprocessor 38 of the channel chip 30 for performing the appropriate scalings by the (N/k) phases of sine and cosine, to compute the harmonic coefficients as set forth in Eqs. 6.

In another embodiment of the method, (N/2k) summations are performed by the harmonic sensor or accumulator 34 shown in FIG. 5 in the following manner. In this embodiment, an analog signal recorded on the data storage disk 18 is received and processed by the preamplifier 29 and sampling digital detector 32 of the channel chip 30 as described above. Similar to the embodiment described above, consecutive digital samples of the digitized waveform can be received by the harmonic sensor 34 shown in FIG. 5 via points A or B of FIG. 3. The consecutive digital samples are received by selection circuitry 343 of the harmonic sensor 34. The selection circuitry 343 is configured to select every (N/2k)$^{th}$ sample of the digitized waveform based on a starting point control signal received from the control unit 26 of the magnetic recording system 10. As the (N/2k)$^{th}$ samples are selected by the selection circuitry 343 the samples are alternately added and substracted to and from, respectively, contents of a register 341 by an arithmetic unit 345, and the result of the arithmetic unit 345 is stored back into the register 341. This process of alternately adding and substracting every (N/2k)$^{th}$ sample is repeated until a last sample of the digitized waveform is received by the selection circuitry 343. The result accumulated in the register 341 when an end of the waveform is reached is then transferred to the microprocessor 38, and a second pass of the recorded analog signal is performed.

During the second pass of the recorded signal, the starting point is typically incremented by one, and the above steps are carried out with this new starting point from which the selection circuitry 343 starts selecting every (N/2k)$^{th}$ sample. The (N/2k)$^{th}$ samples are accumulated in the register 341 as described above, and additional passes of the recorded signal are performed, each with new starting points, until all (N/2k) distinct phases of the signal are accumulated and transferred to the microprocessor 38. The (N/2k) summations transferred to the microprocessor 38 are then scaled and the harmonic coefficients according to Eqs. 7 are computed.

The embodiments of the harmonic sensor 34 shown in FIGS. 4 and 5 are two implementations which have diverse consequences. According to the architecture and method of FIG. 4, the summations required to compute the harmonic coefficients can be obtained during a single read pass of the data storage disk. The ability to obtain the necessary summations in a single pass of the data yields accurate measurements in a time efficient manner. However, the embodiment of FIG. 4 requires more components and increases the size of the channel chip 30, relative to the embodiment of FIG. 5, and thus is more expensive to manufacture. In comparison, the architecture and method of FIG. 5 is very inexpensive to implement since very few components are needed. However, since (N/2k) separate passes are required to obtain the (N/2k) summations needed to compute the harmonic coefficients, this embodiment is slower and could produce less accurate measurements due to distortions occurring with each pass to read the data.

Practical Applications

The following discussion shows some examples of how the channel chip and method having features of the present invention can be used to monitor recording system parameters and optimize performance of the magnetic recording system in which the channel chip is implemented.

The above described harmonic sensor 34 and spectral analysis method can be used to determine nonlinear transition shift (NLTS) of the recording system. To do so, a bit pattern whose k$^{th}$ harmonic indicates nonlinearity is selected and recorded on the data storage disk 18. By selecting a bit pattern of length N=20, whose 5$^{th}$ harmonic indicates nonlinearity, the computations for calculating the Fourier coefficients can be simplified. One such bit pattern that can be used is: 10000011111000000000. Here, the sine and cosine functions are equal to 1, 0, or −1 for each of the possible summations in Eqs. 6. Using Eqs. 7, the coefficients of the fifth harmonic of the N=20 bit pattern are computed as $$Avg(a_k) \alpha \sum_{n=0,4,8\ldots} (x_n - x_{n-2}) \text{ and}$$ (Eqs. 8)

$$Avg(b_k) \alpha \sum_{n=0,4,8,\ldots} (x_n - x_{n-2}).$$

The proportionality symbol, α, is used instead of scaling by N=20 times the number of recorded cycles (M). In terms of the register 346 values, $a_5$=Reg1−Reg3 and $b_5$=Reg2−Reg4. The amplitude, ρ, can then be computed from Eqs. 3.

A reference square wave bit pattern having length N=20 is also recorded and the harmonic coefficients are computed according to Eqs. 8. The computed coefficients are then used to determine a reference amplitude, $\rho_r$, according to Eqs. 3. The percent NLTS can then be determined using the two calculated amplitudes by: % NLTS=$(2/\pi)(\rho/\rho_r)$. The reference amplitude, $\rho_r$, is typically computed from measured data for a simple reference square wave sequence, such as 100 ... 100 ..., where transitions are so far apart that nonlinear demagnetizing fields are negligible.

The above procedure can be implemented and performed by the harmonic sensors 34 of either FIGS. 4 or 5. If the harmonic sensor 34 of FIG. 4 is used, the recorded signals are each read in a single pass and the four separate summations for each 20-bit pattern are computed in one pass each. If the harmonic sensor 34 of FIG. 5 is used, each 20-bit pattern must be read twice to compute the necessary summations, where the odd samples are computed in the first pass and the even samples are read in the second pass.

Another application for which the method and channel chip 30 of the present invention can be used is to determine an overwrite parameter of a head/media combination. Typically this measurement is made by writing a low frequency square wave pattern at frequency $f_l$, and then writing a high frequency square wave pattern with frequency $f_h$, directly over the low frequency pattern. The change in signal amplitude at the low frequency $f_l$ that occurs after writing the high frequency $f_h$ is known as the overwrite (OW) of the head/media combination.

The OW measurement process can be easily implemented by the harmonic sensor 34 and channel chip 30 of the present invention. One must first choose the low and high frequencies at which to perform the OW measurements. Typical choices for the ratio of high to low frequency are, for example, a 2:1 ratio, a 4:1 ratio, or a ratio equal to the ratio of the highest to lowest frequency used in the modulation code of the particular system being measured.

To perform the OW measurements using the channel chip 30 of the present invention, a track is first DC erased, a square wave pattern having the chosen low frequency is written, the square wave pattern is then read and the harmonic sensor 34 performs the summations according to Eqs. 6 or 7. The accumulated results are passed to microprocessor 38 for computation of the Fourier coefficients, and the amplitude $\rho_1$ can be computed according to Eq. 3. Next, a square wave pattern having the chosen high frequency is written directly over the low frequency pattern, and the above procedure is repeated to calculate the residual $\rho_h$ of the low frequency signal. The OW is then determined as OW=$\rho_l/\rho_h$.

A further application for which the method and channel chip 30 of the present invention can be used is to monitor fly height changes. Conventional methods of determining fly height, such as that taught in U.S. Pat. No. 4,777,544 issued to Brown et al., measure fly height based on sensing signal harmonics using a tuneable synthesizer to frequency modulate the signal down to a fixed frequency bandpass filter. Such methods require complex hardware to measure the signal harmonics and determine fly height. The present invention as described above simplifies the process of measuring the signal harmonics, which can then be used in the known manners for calculating fly height, to monitor fly height changes.

The present invention offers many advantages over the prior art. The present invention provides a simplified, quick and inexpensive way to measure spectral content of signals recorded in a magnetic disk storage system. The present invention can be implemented in an existing storage system by adding a simple harmonic sensor comprising an arithmetic unit and a register or registers, to a channel chip of the storage system. The harmonic sensor facilitates summations of digital samples of the recorded signal, which are required for determining signal harmonics according to mathematical models of the signal. Because the summations accumulated by the harmonic sensor 34 of the present invention are based on digital sampling of the recorded signal, the spectral measurements provided by the present invention are more accurate and reliable than the prior art methods. Furthermore, the present invention facilitates and simplifies measurements of harmonic components which can be used to monitor and optimize various recording system parameters. Additionally, the ability to monitor the recording system parameters using the new harmonic sensor in the channel or detector chip is an important advancement. Changes in the system parameters are often indications of system degradation, the ability to monitor the system parameters enables detection of problems before the system fails. Thus, these monitoring capabilities enable improved system quality and integrity.

While the present invention has been particularly shown and described with references to preferred embodiments thereof, it will be understood by those skilled in the art that various changes in form and detail can be made therein without departing from the spirit and scope of the invention as defined by the appended claims. For example, the described versions of the harmonic sensor, or accumulator, are examples of architectures defining two extremes in a tradeoff between speed of execution and size and cost of circuitry. The two versions are exemplary, and alternative intermediate implementations are available to those skilled in the art. Additionally, the present invention can be used in many other known applications requiring measurements of signal harmonics. Furthermore, the aspects of the present invention can be implemented within any digital communication system, and is not limited to a magnetic disk recording system. The disclosures and the description herein are purely illustrative and are not intended to be in any sense limiting.

What is claimed is:

1. A method of spectral analysis using a channel chip of a disk storage system for optimizing and monitoring operating parameters of the disk storage system, the disk storage system including at least one rotatable storage disk having a recording surface on which a periodic analog signal having a plurality of harmonic components is written, the method comprising steps of:

(a) reading the periodic analog signal written on the rotatable storage disk;
   (b) converting the periodic analog signal into a discrete time periodic signal having a period N;
   (c) sampling the discrete time periodic signal at predetermined intervals to obtain a plurality of discrete samples, the predetermined intervals being related to the period N;

(d) selectively accumulating the discrete samples, based on a starting sample, in a register of the channel chip of the disk storage system to obtain a predetermined number of accumulated results;

(e) scaling the accumulated results to obtain coefficients of a given harmonic component of the periodic signal; and (f) using the coefficients of the given harmonic component to determine an amplitude and a phase for the given harmonic component;

wherein the amplitude and phase for the given harmonic component can be used to optimize the operating parameters for improved reliability and performance of the disk storage system.

2. The method of claim 1 wherein the channel chip comprises n registers and the step of accumulating the discrete samples further comprises:

(i) adding a discrete sample to a contents of a particular register of the channel chip indicated by a modulo-n counter;

(ii) incrementing the modulo-n counter by one;

(iii) repeating steps (i) and (ii) until all of the plurality of discrete samples of the discrete time periodic signal have been accumulated; and (iv) transferring the contents of all registers to a microprocessor of the channel chip.

3. The method of claim 1 wherein the step of accumulating the discrete samples further comprises:

(i) receiving one of the discrete samples as a starting sample;

(ii) selectively accumulating predetermined discrete samples in the register of the channel chip, the predetermined ones of the discrete samples selected based on a relationship with the starting sample;

(iii) transferring contents of the register to a microprocessor of the channel chip;

(iv) receiving a different one of the discrete samples as the starting sample; and (v) repeating steps (ii)–(iv) until all of the plurality of discrete samples of the discrete time periodic signal have been accumulated and transferred to the microprocessor of channel chip.

4. The method of claim 3 wherein the step of selectively accumulating predetermined discrete samples in the register comprises alternately adding and subtracting the selected discrete samples to the contents of the register.

5. A channel chip for spectral analysis of a periodic waveform in a disk recording system, the disk recording system including a disk assembly, a microprocessor, a controller having a control processor, and preamplifier circuitry, the periodic waveform being recorded on a data storage disk of the disk assembly as an analog signal, the channel chip comprising:

(a) a sampling digital detector connected to the preamplifier circuitry for receiving an amplified analog signal and converting the amplified signal into a discrete sequence of digital samples; and (b) a harmonic sensor connected to the sampling digital detector for selectively accumulating predetermined digital samples to measure spectral content of the analog signal;

wherein the accumulated digital samples of the harmonic sensor are transferred to the microprocessor for determining characteristics of the analog signal in response to the measured spectral content of the analog signal, to optimize operating parameters of the disk recording system and to monitor health of the recording system, wherein the optimized operating parameters enable improved reliability and performance of the disk recording system.

6. The channel chip of claim 5, wherein the periodic waveform has a period N and the harmonic sensor is capable of measuring a kth harmonic of the periodic waveform, and wherein the harmonic sensor comprises an accumulator for selectively accumulating the samples of the of the sequence of digital samples.

7. The channel chip of claim 6, wherein the accumulator comprises:

(i) a bank of N/k registers for selectively accumulating the sequence of digital samples; and (ii) a modulo-(N/k) counter for indicating which of the N/k registers an individual sample of the sequence of digital samples is to be accumulated in, wherein the modulo-(N/k) counter is initially set to one when the analog signal is received from the transducer, a first sample of the sequence of digital samples is accumulated in the first register, and the modulo-(N/k) counter is incremented and consecutive samples of the sequence of digital samples are accumulated in the register indicated by the modulo-(N/k) counter, and wherein as the consecutive samples are accumulated, the samples are added to contents of the register indicated by the modulo-(N/k) counter.

8. The channel chip of claim 7, wherein the accumulator further comprises:

(iii) a demultiplexor having a single input connected to receive a sum of samples and (N/k) outputs respectively connected to the (N/k) registers, the demultiplexor being responsive to the modulo-(N/k) counter for selecting which of the (N/k) registers the received sum of samples is to be accumulated in;

(iv) a multiplexor having (N/k) inputs respectively connected to receive the contents of the (N/k) registers and a single output, the multiplexor being responsive to the modulo-(N/k) counter for selecting the contents of one of the (N/k) registers to which a sample of the sequence of digital samples is to be added; and (v) an adder circuit having a first input connected to receive the sequence of digital samples, a second input connected to receive the output from the multiplexor and an output connected to the demultiplexor, the adder circuitry receiving the sequence of digital samples one sample at a time, and summing a received sample of the sequence of digital samples and the contents of one of the (N/k) registers output from the multiplexor, wherein (N/k) accumulations are obtained after a single read pass of the analog signal.

9. The channel chip of claim 6, wherein the accumulator comprises:

(i) selection circuitry, configured responsive to a control signal from the controller, for selectively receiving predetermined samples of the sequence of digital samples from the sampling digital detector;

(ii) a register in which the samples from the sequence of digital samples are accumulated; and (iii) an adder substracter circuit having a first input connect to the sampling digital detector, a second input connected to the register and an output connected to the register, the adder substracter circuit for alternatively adding and substracting the received sample to and from contents of the register, wherein the control signal indicates to the selection circuitry a starting point of the sequence of digital samples at which to select a starting sample from the sampling digital detector, the starting sample is added to the contents of the register and stored back into the register, every (N/2k)th sample is then received as subsequent samples and alternatively substracted and added to the contents of the register until an end of the waveform is reached, and when the end of the waveform is reached the contents of the register is passed to the microprocessor, and wherein subsequent read passes of the analog signal are performed such that the starting point is incremented and every (N/2k)th sample is selected for each subsequent read pass, and the subsequent read passes are performed until all (N/2k) phases are accumulated and passed to the microprocessor.

10. The channel chip of claim 6 wherein the sampling digital detector comprises:

(i) a variable gain amplifier set to a constant gain;

(ii) an analog filter connected to an output of the variable gain amplifier for filtering the analog signal received from the variable gain amplifier;

(iii) an analog to digital (A/D) converter connected to the analog filter for sampling the filtered signal and converting the signal into the sequence of digital samples.

11. The channel chip of claim 10 wherein the sampling digital detector further comprises a digital filter for filtering the sequence of digital samples.

* * * * *